United States Patent [19]

Rittenbach

[11] 4,430,655

[45] Feb. 7, 1984

[54] RADAR TARGET ANGLE MEASURING SYSTEM

[76] Inventor: Otto E. Rittenbach, 17 Jumping Brook Dr., Neptune, N.J. 07753

[21] Appl. No.: 446,922

[22] Filed: Dec. 6, 1982

Related U.S. Application Data

[63] Continuation of Ser. No. 159,539, Jun. 16, 1979, abandoned.

[51] Int. Cl.³ .......................... G01S 13/00; G01S 7/28
[52] U.S. Cl. .............................. 343/16 LS; 343/5 SW;
343/13 R; 343/17.1 R
[58] Field of Search ............... 343/5 SW, 13 R, 16 R,
343/16 LS, 17.1, 17.2 PC

[56] References Cited

U.S. PATENT DOCUMENTS

| | | | |
|---|---|---|---|
| 2,424,984 | 8/1947 | Hoffman | 343/16 LS |
| 2,730,710 | 1/1956 | Loeb | 343/16 LS |
| 2,817,835 | 12/1957 | Northington, Jr. | 343/16 R |
| 3,332,077 | 7/1967 | Nard et al. | 343/7 ED |
| 3,371,343 | 2/1968 | Jones | 343/17.2 PC |
| 3,573,819 | 4/1971 | Mason et al. | 343/13 R |
| 3,878,525 | 4/1975 | Alpers | 343/14 |
| 4,015,261 | 3/1977 | Campbell | 343/5 SW |
| 4,124,850 | 11/1978 | Frazier, Jr. | 343/7.3 |

*Primary Examiner*—S. C. Buczinski

[57] ABSTRACT

A radar system for measuring an angle of a target. A radar antenna produces, at any given instant, one of a pair of directional radar beams. The beams are angularly displaced with respect to each other and overlap within the expected target direction. A code generator sends a train of R-F pulses to the radar antenna. An antenna beam switch, connected between the antenna and the code generator, switches, over a set period of time, every other pulse to one radar beam and the remaining pulses to the other radar beam. The two resulting coded pulse groups differ from each other. A receiver is connected to the radar antenna to receive return signals during a time period which corresponds to a given target range distance. The return signals are auto-correlated with replicas of the transmitted coded signals and the respective correlation outputs are ratio compared with each other to determine exact target angles.

1 Claim, 2 Drawing Figures

RADAR TARGET ANGLE MEASURING SYSTEM

The invention described herein may be manufactured, used, and licensed by or for the Government for governmental purposes without the payment to me of any royalty thereon.

This application is a continuation of my U.S. patent application Ser. No. 159,539 filed June 16, 1979, now abandoned, which is a continuation-in-part of my United States patent application Ser. No. 973,356, entitled "A Range-Gated Doppler Radar System" filed Dec. 26, 1978, now U.S. Pat. No. 4,219,812, incorporated herein by reference.

FIELD OF THE INVENTION

This application relates to a radar system for improving the accuracy of measurement of the angle of a target of the type which includes antenna beam switching means for transmission and reception of radar pulses over either one or the other of two directional beams of electromagnetic energy, each angularly displaced with respect to one another and overlapping one another within the expected target direction.

A series of switching pulses occurring at the same repetition rate as the transmitted rf pulses and during the interval between successive ones of said transmitted rf pulses is applied to the antenna beam switching means in such a manner that the antenna beam direction is shifted back and forth for each successive switching pulse.

The transmitted rf pulses may be phase modulated by a code.

BACKGROUND OF THE INVENTION

In the prior art, to measure the azimuth or the elevation of a target in an electronic scanning system a repetition frequency, which pulses are either unmodulated or phase modulated in accordance with a code; alternatively, a first group of a series of adjacent rf pulses is transmitted in which constituent pulses of each series are phase modulated in accordance with a code and transmitted within a prf interval. This first group is transmitted along a first beam and the corresponding group of returns from the target received along this frst beam are processed, a second identical group of rf pulses next is transmitted along a second beam which overlaps the first beam within the expected target direction and the corresponding group of target returns received along the second beam are subsequently processed. The period of transmission and reception of both groups of transmitted and received pulses together form a target acquisition cycle. The ratio of the two processed group returns provides a measure of the direction of the target. This technique is of sufficient accuracy only for targets which present the same cross section to the transmitter during the interval between the first and last pulses of the pulse groups and for targets which do not change appreciably in azimuth, elevation, range and velocity (doppler frequency change) during this time interval.

SUMMARY OF THE INVENTION

In order to measure accurately the azimuth or elevation of a target in an electronic scanning system wherein the target cross section, range, azimuth, elevation or velocity changes appreciably during the interval between first and last pulses of a pulse group, the switching of antenna beams is accomplished at a rate sufficiently high to avoid an undesirable response to said changes in target cross section, range, azimuth, elevation or velocity. This high rate is achieved by switching either before each pulse of a group, or before each series of adjacent pulses of a group, as the case may be.

The invention and its mode of operation will be more fully understood from the following detailed description when taken with the appended drawings, in which:

DESCRIPTION OF AN EMBODIMENT OF THE INVENTION

Figure 1:
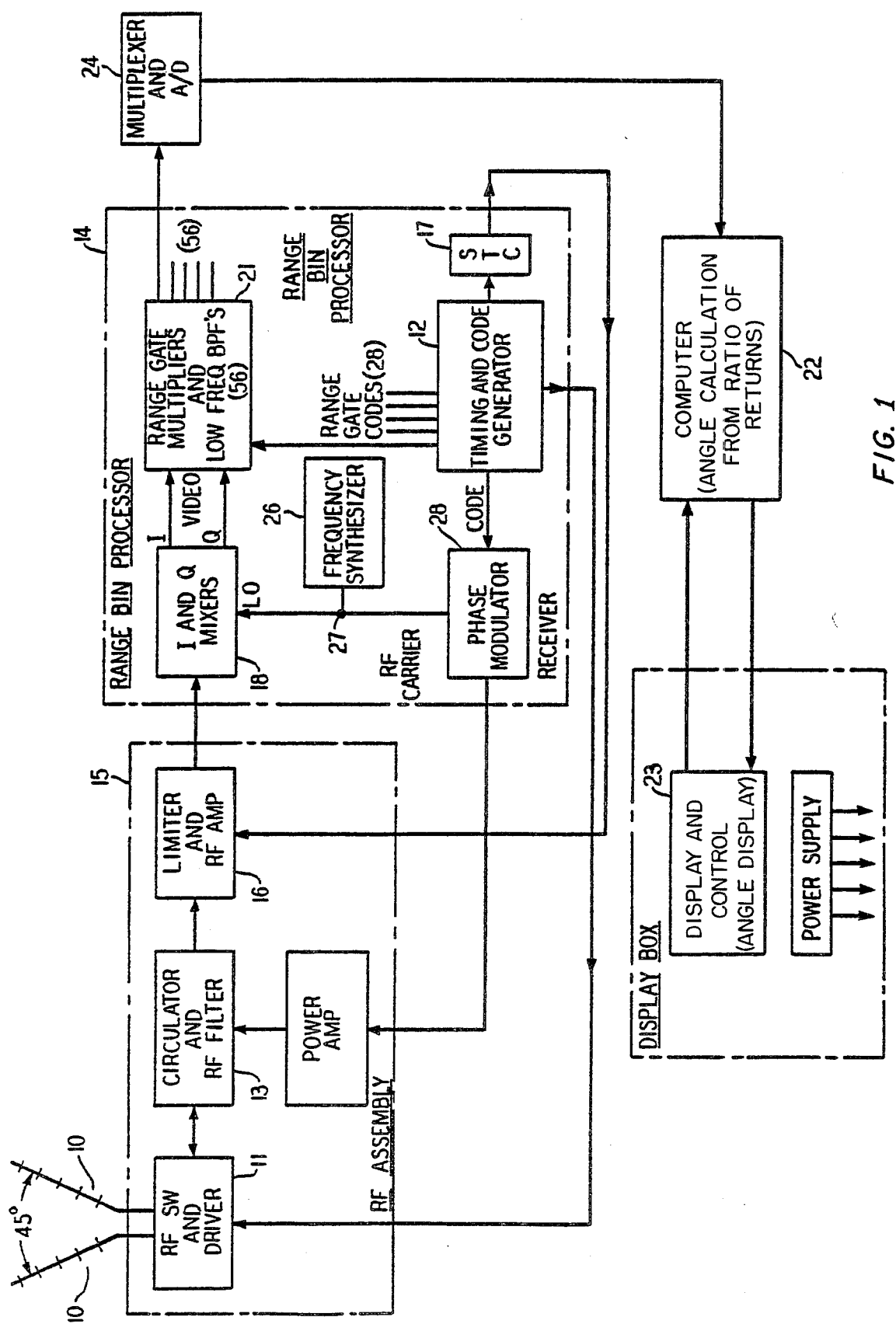
FIG. 1 is a block diagram of an illustrative radar system according to the invention.

The invention may include a coherent radar system that performs correlation detection in the receiver.

In order to achieve stability, the transmitted signal may by obtained from frequency synthesizer 26 which includes a crystal oscillator and means for multiplying the crystals' output up to the transmitted frequency. A power divider 27 sends half the power to the mixers 18 and the other half to a phase modulator 28.

All the timing in the system may be derived from a stable 15 MHz crystal clock in the timing and code generator 12, which further contains the circuits necessary to generate either a group of unmodulated pulses, a group of pulses modulated in accordance with a binary sequence (code) or a group of a series of modulated pulses. If the coded signal used is in binary form, operation of the system may require the transmitted signal and the code to each correlator to have 3 states. off, +1 (or 0°), and −1 (or 180°). This latter function may be accomplished in a trinary generator which accepts the binary code and an associated gate and by uniquely combining them, generates the 3 level code.

As shown in the FIG. 1, two antennas 10, which, for example, may be horizontally polarized, 212 MHz log-periodic antennas, are used to provide spaced overlapping antenna beams. These antennas are alternately switched in the system in order to implement a sequential lobing beam splitting technique in either azimuth or elevation. For simplicity of illustration and explanation, only one antenna means 10 is shown and described, namely for measurement of azimuth. Alternatively, a single antenna can be used with phase shifters to produce the two antenna beams. The switching is done by means of rf switch 11 driven by switching pulses drived from a timing and code generator 12. The action of the rf switch in 11 is such that each time a switching pulse is derived from unit 12, the switch is reversed and the direction of the antenna beam is altered. A 30 MHz bandwidth (60 dB points) bandpass rf filter 13 is connected to switch 11 to truncate the bandwidth of the transmitted signal and to keep out-of-band signals from the receiver 14. A 4-port circulator is associated with filter 13 and used as a duplexing device between rf assembly 15 and range bin processor 14 while a limiter 16 provides burnout protection against strong signals for the rf amplifier front end. A low noise rf amplifier associated with limiter 16 provides sufficient gain to establish the overall noise figure needed for the required sensitivity. The gain is also compatible with the large signals expected, thereby maintaining unsaturated operation. A sensitivity time control 17 is used to manually adjust the receiver gain, depending upon the strength of the signals being returned.

The received signal may be split in unit 18 into two quadrature channels, I and Q, to implement balanced processing, or only one (I) channel may be used. Each mixer in detector 18 is a synchronous detector that beats the incoming signal down to video. Each pair of I and Q channels have the same coded associated therewith.

The detector outputs feed video signals to a plurality of range bin correlators which are located in unit 21 and which comprise range gate multipliers and low frequency band pass filters. The video signal appearing at the input to each multiplies 21 is multiplied by the correct coded signal for that particular range. The output of the multiplier is a constant amplitude signal, lasting for the length of the code in each transmission period, if the return is from a target at that range. Returns from targets at the other ranges that overlap into another range bin will be uncorrelated and produce positive and negative components during the multi-bit code length at the multiplier output. For example, 56 correlators may be used, including two correlators for direction finding. These 56 signals are supplied to multiplexer and analog-to-digital converter 24, thereby providing azimuth information to a computer 22 for ultimate display on a display unit 23. The computer obtains the azimuth angle by forming the ratio of integrated returns of the two antenna beams.

Figure 2:
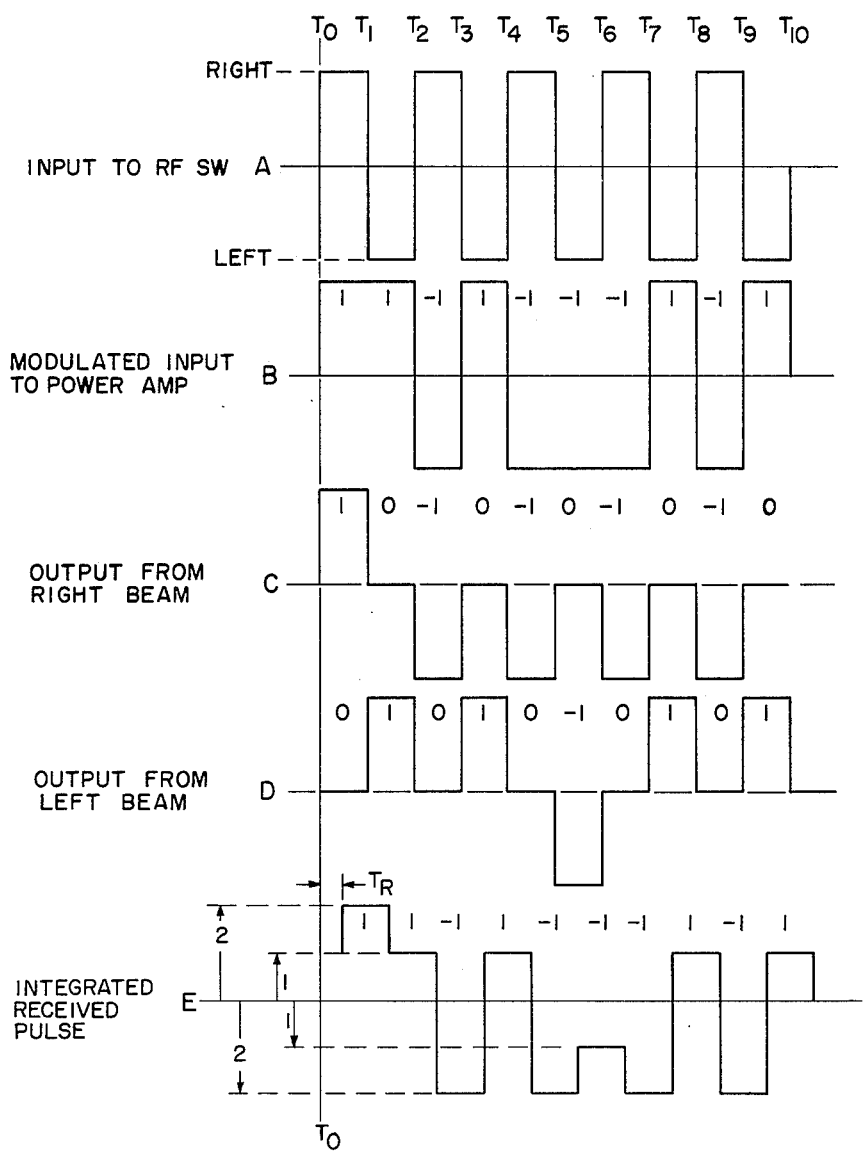
FIG. 2 is an illustrative of the transmitted and received pulses of a typical target acquisition cycle of a device in accordance with the invention.

By way of illustration of the principles of the invention as it has been set forth, FIG. 2 depicts a typical target aquisition cycle in which waveform A shows an input pulse train to the RF switch and driver 11 of FIG. 1. This input is then combined with the phase modulated input to the power amplifier, shown as waveform B, to form the coded output waveform. For the purposes of illustration, the waveforms are shown as pulses and are designated as having three states: 0 for the off-state, $+1$ for an in-phase signal, and $-1$ for a 180° out-of-phase signal.

As the output beam is time-multiplexed, or switched alternately between the left and right antennas, in accordance with the invention, such that adjacent pulses sent on alternate beams, waveforms C and D indicate the output from the right and left beams, respectively. In this particular case, the right beam as shown by waveform C is in an operative state from $t_0$ to $t_1$, from $t_2$ to $t_3$, and so on. In a likewise fashion, the left beam is operative from $t_1$ to $t_2$, from $t_3$ to $t_4$, and so on.

Waveform E shows the recombined or de-multiplexed pulse train which is received by the system at time $(t_0+t_r)$. For the purposes of this illustration only, the right beam return is shown to be of higher amplitude than the left beam return by a two-to-one ratio. As it is readily apparent from waveform E, the pulse trains from the two switched beams are integrated, or recombined, with the amplitudes of adjacent pulses of the resulting waveform providing a precise indication of target angle.

In the case wherein a group of a series of pulses are used to obtain high power, the subsequent description of the code will, for the sake of clarity of explanation, be based on the assumption that only one antenna beam forming means will be used and that only its return signal will be processed.

A maximum length shift register of m-sequence can be used to directly modulate the phase of a continuous-transmission type of radar. One of the important features is that the m-sequence is broken up into short subsequence which are transmitted at some repetition rate to gain the advantages of a pulsed radar without losing the low side lobe benefits of the m-sequence autocorrelation function.

With modulo two addition of the output of certain selected stages, it is possible that an n-stage binary shift register can be used to generate m-sequences. The sequences generated in this manner are periodic with $2^n-1$ bits per period. For an 8-stage shift register, 16 pseudo-random sequences can be generated with 255 bits per period by utilizing different combinations of feedback taps. All m-sequences have autocorrelation functions which peak to a relative value of $2^n-1$ when the bit sequences line up and have a relative value of $-1$ for all other displacements of the sequences. Since the m-sequences are periodic, the autocorrelation function is also periodic.

Since the autocorrelation function for m-sequences from an n-stage shift register has a peak-to-side lobe ratio of $2^n-1$, it was a goal to have approximately the same characteristics from any new code generated from the pseudo-random sequences. In other words, there should be as many as K-bit vectors in the transmitted code word vocabulary as there are bits in the sequence.

One method of selecting the transmitted words from a pseudo-random sequence is to select K contiguous bits from the sequence starting at some arbitrary point in the sequence, then, after waiting some desired length of time, the next K contiguous bits of sequence are selected for transmission. This process is continued as long as transmission is desired. The second method of generating the code words for transmission is to select K contiguous bits from the pseudo-random sequence, starting at some arbitrary point in the sequence; then pass over the next M contiguous bits before selecting the next K-bit word. This process is continued as long as transmission is desired. The question that must be answered is, what values of K in the first method and of $K+M$ in the second method can be used to generate a vocabulary of K-bit words which have at least as good an autocorrelation function as the pseudo-random sequence. A necessary condition for a good code selection is that as many K-bit words are in the vocabulary as there are bits in the pseudo-random sequence.

Since the first method can be solved from the second method by taking M as zero, only the second method is considered. Clearly, when some integer multiple $\mu$ of $K+M$ is equal to some other integer multiple $V$ of $2^n-1$, the code words will begin repeating. Therefore, the number of code words in the vocabulary would be $\mu$. The ratio that must be examined is the following:

$$\mu/V=(2^n-1)/(K+M), \mu, V \text{ integers.}$$

Since the desired number of code words is $2^n-1$, the condition for a suitable code is that $K+M$ and $2^n-1$ form a irreducible ratio. Therefore, $2^n-1$ and $K+M$ must not have common primary factors. An 8-stage register has pseudo-random sequences of 255 length. The prime factors of 255 are 3, 5 and 17. If, for example, the value of $K=11$ and $M=81$ were being tested, the prime factors of $K+M=81$ were being tested, the prime factors of $K+M=92$ must not be common to 255 (3, 5, 17). The prime factors of 92 are 2, 2, and 23. Therefore, the condition is satisfied. Since the starting bit is arbitrary and the number of code words is $2-1$, the $k^{th}$ bit of the code word must take on the value of each bit in the pseudo-random sequence once and only once for all values of k from 1 to K. The validity of this statement is evident from examining the first bit of each word. If the first bit in the word took on the value of the same bit in the pseudo-random sequence more than once, those works would be identical because of the method of selection. Since $2^n-1$ different words are in the vocabulary, the first bit must take on the value of every bit in the pseudo-random sequence once and only once. The validity of the statement for other bit positions follows immediately because of the rules of selection.

Since the K-bit words are formed from contiguous bits in the pseudo-random sequence and every bit value of the pseudo-random sequence is acquired once and only once at each bit position in the K-bit word, it is evident that the autocorrelation function will have a peak value of $K(2^n-1)$, a one bit slip value of $-(K-1)$, and a K bit slip value of $-(K-k)$ where $k=1, 2, \ldots, K-1$. It has been assumed that $M>K$ for the autocorrelation values. This autocorrelation function is better than the m-sequence autocorrelation function on the basis of less than one word slippage.

Clearly, when $K+M$ is considerably smaller than $2^n-1$, the first, second and possibly more time-around echoes have good correlation properties. Therefore, the code selected must be carefully examined to insure that multiple time-around echoes do not produce large correlation function values for the largest anticipated time delay. For the sample previously, $K=11$, $M=81$, and $2^n-1=255$, the correlation properties were examined out to a 50-word slip. The first significant pop-up of the correlation function occurs for an 11-word, 8-bit slip. The second pop-up occurs for a 36-word, 3-bit slip. These auxiliary peaks in the correlation function are of negligible consequence because they occur at distances of 11 times and 36 times the normal radar range. At these ranges, the fourth power path loss is greater than the magnitude of the pop-ups. Sensitivity time control provides additional atenuation for most of the range bins.

The 11-bit return echo from a target in the first range bin is eclipsed to a single-bit word. Therefore, the correlating waveforms is also a single-bit word. It is clear from the foregoing that each bit position of the original function for the first range bin will be more like original m-sequence autocorrelation function, namely, a peak value of $2^n-1$ and off-range correlations of $-1$ for all ranges out to the $k^{th}$ range.

If a group of equally spaced rf pulses, each in phase with the carrier frequency, is to be transmitted, the timing and code generator 12 will produce simply a group of pulses occurring at the desired pulse repetition frequency (prf) which is impressed on the rf carrier by modulator 28 to provide rf pulses; in this case, modulator 28 provides pulses of phase identical to that of the rf carrier. A switching pulse is supplied to the RF Switch and Driver 11 for each of the aforesaid rf pulses and each switching pulse occurs just prior to the next of said rf pulses so as to maximize the unambiguous range. The switching pulses have the same prf as the transmitted rf pulses. The latter serves also as an rf power amplifier (driver). Each time a switching pulse from unit 12 is supplied to the rf switch in unit 11, the direction of the antenna beam producing means is caused to alternate between limits of, for example, $+22\frac{1}{2}°$ and $-22\frac{1}{2}°$, that is, successive pulses will cause the antenna beam pattern to shift back and forth through 45° in azimuth or in elevation, as the case may be.

If each of the rf pulses to be transmitted are to be phase coded, the coding is achieved by phase modulator 28 in accordance with the code derived from unit 12. These coded pulses will be transmitted, as before, alternately along the two antenna beam producing means 10. The switching of the antenna beam producing means 10 is accomplished, as before, by switching pulses from unit 12.

If in order to obtain increased power, a group of a series of adjacent phase-coded pulses are to be transmitted, then the switching pulses from unit 12 will occur at intervals of $(K+M)/2$. The details of the code are the same as given in the previous paragraphs. For example, if $K=11$ and $M=81$, a switching pulse will be provided at the output of unit 12 for every 46 pulses from the clock in timing and code generator 12.

In normal situations, separate weighting functions which are identical but shifted in time by one pulse repetition interval are used for each group of pulses and each weighting function is multiplied by each of the pulses of the corresponding group.

For applications wherein the target parameters, such as target cross-section, are changing extremely rapidly, a single weighting function is used which is centered on any one of the returns. One could obtain a trapezoidal weighting function by, for example, having one less rf pulse in one of the interlaced groups of returns, than in the other group of returns. From the longer of the two pulse groups the first and last pulses would be processed in the computer at half amplitude.

Additional pulses may be transmitted prior to the pulses used for target detection in the unambiguous range for improved multiple-time around clutter rejection.

It should be understood that the coding may be other than m-sequence (pseudo-random); for example, Barker codes, as well as random codes may be used.

What is claimed is:

1. A radar system for measuring the angle of a target comprising:
   radar antenna means for producing at any instant one of a pair of directional radar beams, said beams angularly displaced with respect to each other and overlapping each other within the expected target direction;
   radio frequency pulse means for generating and transmitting to said radar antenna means a train of radio frequency pulses to form a target acquisition cycle;
   antenna beam switching means connected between said radar antenna means and said pulse means for switching, over a common time period, a first series of pulses extracted from said train of pulses to one of said radar beams and a second series of pulses extracted from said train of pulses to the other of said radar beams;
   said first series of pulses being formed from every other pulse in said train of pulses and said second series of pulses being formed from the other of said pulses in said train of pulses;
   said first series of pulses forming a first code and said second series of pulses forming a second code that differs from said first code;
   radio frequency signal receiver means connected to said antenna means for receiving signals received by said antenna means during a predetermined time slot corresponding to a given range interval;
   means for correlating signals received by said radio frequency receiver means with signals corresponding to said first and second codes to form first and second correlation outputs; and
   means for determining the ratio of energy in said first and second correlation outputs to obtain to target angle.

* * * * *